Figure 1:
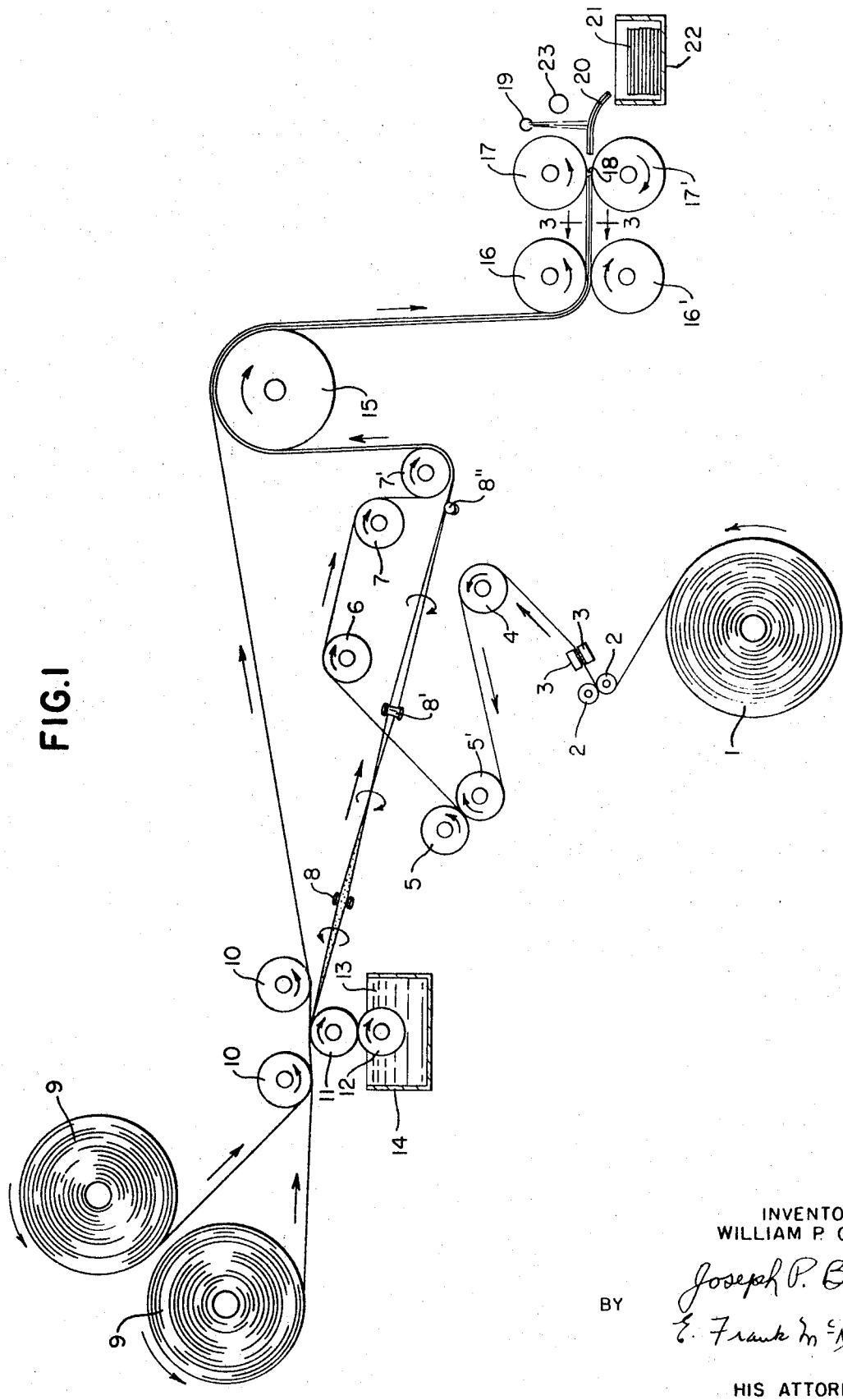

United States Patent

[11] 3,627,626

[72] Inventor William P. Chao
Dayton, Ohio
[21] Appl. No. 857,935
[22] Filed Sept. 15, 1969
[45] Patented Dec. 14, 1971
[73] Assignee The National Cash Register Company
Dayton, Ohio

[54] MAGNETIC LEDGER CARDS AND A METHOD FOR FORMING THE SAME
17 Claims, 8 Drawing Figs.

[52] U.S. Cl. .................................................. 161/184,
156/330, 156/331, 161/231, 161/256, 274/41.4
[51] Int. Cl. ..................................................... B32b 27/38,
G11b 5/00
[50] Field of Search ......................................... 274/41.4;
161/184, 231, 233, 251, 256; 156/330, 331

[56] References Cited
UNITED STATES PATENTS

| | | | |
|---|---|---|---|
| 2,438,195 | 3/1948 | Tierney | 117/122 |
| 2,615,008 | 10/1952 | Greenlee | 260/47 |
| 2,674,009 | 4/1954 | Williams | 156/252 |
| 2,681,327 | 6/1954 | Brown | 260/41.5 |
| 2,688,567 | 9/1954 | Franck | 117/64 |
| 2,858,291 | 10/1958 | McAdam | 260/45.5 |
| 3,023,123 | 2/1962 | Colwill et al. | 117/44 |
| 3,179,533 | 4/1965 | Rusch | 117/76 |
| 3,205,121 | 9/1965 | Eichler et al. | 161/231 |
| 3,297,622 | 1/1967 | Grosner et al. | 161/184 X |
| 3,440,091 | 4/1969 | Delmore | 117/216 |
| 3,513,021 | 5/1970 | Sweeney et al. | 161/251 X |

Primary Examiner—Harold Ansher
Attorneys—Joseph P. Burke and E. Frank McKinney

ABSTRACT: The present disclosure is directed to methods of laminating and laminates wherein magnetic ledger cards are prepared by an "in-line" procedure involving interposing between paper or other ledger card base stock and the plastic surface of magnetic tape a solvent-based, temporarily pressure-sensitive adhesive composition comprised of about 10 to about 30 weight percent solids and correspondingly about 70 to about 90 weight percent liquid organic solvent wherein the solids are comprised of from about 15 to about 35 weight percent of nitrile rubber and from about 65 to about 85 weight percent of epoxy resin. The liquid (organic solvents) portion can be, and preferably is, comprised of a mixture of organic solvents, including ketones, liquid hydrocarbons and mixtures thereof. The viscosity of the aforementioned adhesive solution at the time of application to the magnetic tape during lamination ranges from about 55 to 95 c.p.s.

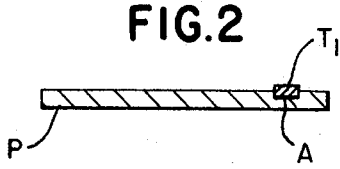
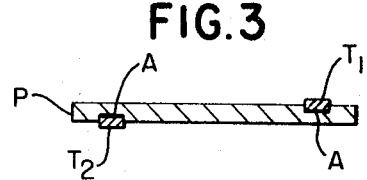
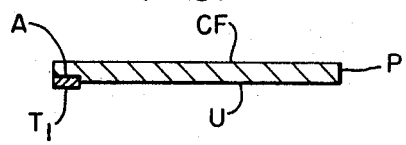
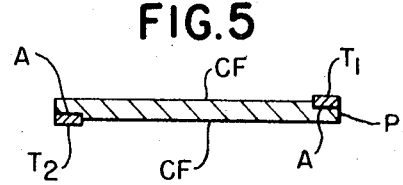
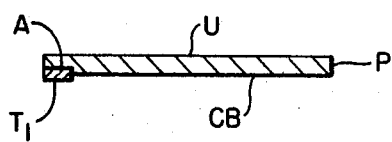
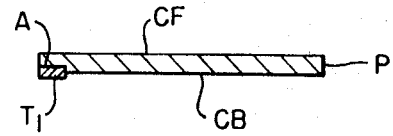
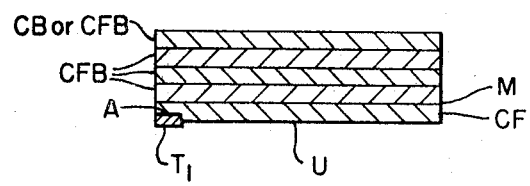

MAGNETIC LEDGER CARDS AND A METHOD FOR FORMING THE SAME

The recent surge in the utilization of computers, programmed accounting machines, and other devices utilizing magnetically stored information has produced a need to develop an improved ledger card capable of containing magnetic information. It is in response to this need that the present invention is directed. The ledger cards, which contain the magnetically stored information, are usually made of paper and they must be flat in both the longitudinal and cross-directions. Card curling in either direction causes handling difficulties in the card handler portion of an apparatus. Of equal importance, the magnetic stripe, or other form of magnetic information applied to or deposited upon these ledger cards, should also be flat, or the magnetic information will very likely be separated from the magnetic head in the card handler device, and signal loss will occur.

In accordance with this invention, the magnetic storage capability is provided on the card in the form of a magnetic tape, viz., a plastic substrate containing a magnetic layer, e.g., a coating of magnetic iron oxide (or equivalent magnetic material). In order to be able to utilize this magnetic plastic tape, the tape stripe (or other desired configuration) surface must also remain flat, or the tape stripe will be separated from the magnetic head in the card handler, thereby resulting in signal loss. This signal loss is especially marked in cases where the magnetic tape contains a high density of information, e.g., at high-bit densities greater than 200 bpi (bits per inch).

During the investigation and research which led to the discovery of this invention, it became evident that an adhesive would be required which (1) would provide a fiber-tearing bond (or equivalent) for tape to paper (or other suitable ledger card substrates) of at least 50 grams per quarter inch of tape width and preferably at least 100 grams (Instron test rating per 0.25 inch wide tape), (2) would not disrupt the balance of moisture content in the card, (3) was flexible enough to accommodate tape movement during postlamination dimensional stabilization thereof, viz., allow the magnetic tape to expand or shrink substantially independent of the ledger card base stock thereby preventing ledger card curling under conditions wherein the card would undergo ambient changes as to relative humidity at varying temperatures, viz., usually ranging from about 18 percent to 90 percent relative humidity at temperatures of about 65° F. to 100° F. and yet (4) provide dimensional stability while the laminate ledger base stock, tape and adhesive were aging under widely varying environmental storage and use conditions.

The present invention is conditioned upon the discovery that the aforementioned requirements are met to a substantial extent by utilization of an adhesive solution containing a mixture of specific dissimilar polymeric components. Thus, it has been discovered that magnetic ledger cards and similar articles of manufacture can be produced in a reasonable high-speed laminating operation when utilizing an epoxy-nitrile rubber adhesive solution of the type described more specifically hereinbelow.

The adhesive solution composition at the time of application to the magnetic tape should have a viscosity ranging from about 55 to 95 c.p.s. More usually the viscosity at the time of application ranges from about 60 to 90 c.p.s. and preferably from about 72 to 78 c.p.s. The laminating adhesive is comprised of from about 10 to about 30 weight percent solids—the remainder being the organic solvent liquid. Usually, the solids concentration ranges from about 15 to about 25 weight percent and more preferably from about 18 to about 22 weight percent with the remainder being composed of evaporable organic solvent liquid. The solids portion of the adhesive composition is comprised of from about 15 to about 35 weight percent of nitrile rubber and from about 65 to about 85 weight percent of epoxy resin. After solvent evaporation and setting of the adhesive has occurred, these solids constitute essentially all of the adhesive composition (on a dry basis). Usually, the nitrile rubber concentration ranges from about 20 to 30 weight percent with the epoxy resin ranging from 70 to 80 weight percent (based on total solids). More preferably, however, the nitrile rubber concentration ranges from about 23 to 27 weight percent and the epoxy concentration ranges from about 73 to 77 weight percent. The nitrile rubber is, itself, comprised of a copolymer of butadiene and acrylonitrile. The butadiene-acrylonitrile copolymers are sometimes referred to as acrylonitrile rubbers or acrylonitrile-butadiene rubbers. These copolymers are in essence synthetic rubbers made by the copolymerization of acrylonitrile with butadiene. In accordance with this invention, it is possible to employ butadiene-acrylonitrile copolymers of comparatively low acrylonitrile content, viz., usually below 45 and, more preferably, ranging from 15 to 45 weight per cent acrylonitrile, the remainder being butadiene, viz., butadiene-1,3. These copolymers have good resilience and low-temperature flexibility. The epoxy resins employed herein are comparatively low-molecular weight condensates of an epihalohydrin, e.g., epichlorohydrin, and a bisphenol, e.g., bisphenol-A. Usually the epoxy resin employed is actually a polymeric mixture of condensates having components that range from unreacted monomer to pentamer.

The liquid portion of the adhesive composition, viz., the organic solvent, can be composed of one or more ketones, such as acetone (dimethyl ketone), methyl-ethyl ketone, methyl isobutyl ketone; liquid hydrocarbons, such as $C_5$ and higher liquid hydrocarbons, such as, those having from five to 10 carbon atoms, e.g., pentanes, such as n-pentane, hexanes, such as n-hexane, isohexanes, 2,2-dimethyl butane, cyclohexane, neptanes, octanes, nonanes, decanes, etc.

According to this invention, an "in-line" procedure is employed to form the laminate. That is to say, the adhesive employed to conduct lamination of the paper (or other ledger card base stock) to the flexible plastic tape layer having a magnetic deposit thereon (on its remote surface), is applied during the lamination operation itself. Basically, the lamination procedure is conducted by passing the magnetically coated plastic into contact with the aforementioned adhesive solution so as to deposit a sufficient coating of the adhesive on the plastic to enable adequate adhesion to result when the adhesively coated plastic magnetic tape is then brought in contact with the ledger card base stock, e.g., paper or other equivalent material. The epoxy-nitrile rubber adhesive composition is applied to the previously uncoated (nonmagnetic) surface of the magnetic tape lamina, viz., that portion not having the magnetic coating thereon. The magnetic tape can then be guided into contact with the ledger card base stock and contacted therewith with the adhesive side of the plastic magnetic tape facing the ledger card base stock. No extraneous pressure need be employed above and beyond that necessary to bring the adhesive surface of the plastic tape into contact with the paper, as at this stage the adhesive is sufficiently tacky to adhere to the paper once it is placed in contact therewith. Of course, extraneous pressure can be used, if desired, e.g., as by use of a pair of rollers at the lamination station(s).

Prior to the laminating procedure, it has been found advantageous to subject the paper ledger card base stock to a decurling operation in order to flatten the paper thereby compensating for previous curl present in the paper. This is due to the fact that paper usually supplied in the form of a roll in which the paper is stored in curled (roll) form. Since the ledger cards are to be used in the flat mode, this decurling has proved advantageous. Decurling is usually conducted in accordance with this invention by passing the paper through three rolls thereby providing a reverse curl to the paper compared to the direction in which it was curled on the roll. Subsequent to the decurling operation, the paper is laminated to the magnetic tape and the magnetic ledger card laminate is sheeted, viz., cut into individual laminated sheets of the desired size.

According to a preferred embodiment of this invention, the paper can be grooved (to reduce tape height) prior to positioning the adhesive coated plastic magnetic tape during lamination. The width of each such groove can be the same as or wider than the width of the magnetic tape and the groove is usually rectangular or square in cross section to accommodate the tape. The adhesive side of the magnetic tape is then positioned within the groove during lamination thereby reducing the overall differential height of the tape compared to the remaining surface of the paper. Characteristically, the magnetic layer extends substantially the entire width of the tape substrate.

The magnetic tape employed in accordance with this invention is characteristically a flexible plastic, e.g., polyester plastic tape, e.g., "Mylar," viz., polyethylene terephthalate. However, it is within the purview of this invention to employ other plastic materials, including, but not limited to, such plastic materials as: cellulosic materials, e.g., cellulose acetate, cellulose acetate-butyrates; polyalkyl acrylates and polyalkyl methacrylates, including homopolymers and copolymers of the lower alkyl, viz., $C_1$ to $C_4$, acrylates and methacrylates, e.g., polymethyl acrylate, polyethyl acrylate, polymethyl methacrylate, polyethyl methacrylate; etc. The magnetic tape thickness (including both the flexible plastic substrate and the magnetic coating) can range from about 0.4 to 2.5 mols. Usually, the thickness of the flexible plastic tape (without the magnetic layer) ranges from about 0.3 to 1.7 mils and the thickness of the magnetic oxide coating ranges from about 0.1 to about 0.7 mils. According to a preferred embodiment of this invention, the total magnetic tape thickness (including both the flexible plastic substrate and magnetic oxide coating) ranges from 0.75 to 2.0 mils. A suitable commercially available magnetic tape is "777" (marketed by 3M Co.) which is nominally polyethylene terephthalate 1.5 mil thick polyester tape, e.g., 1.42 mils thick, previously provided with a nominally 0.5 mil thick, e.g., 0.4 to 0.6 mil thick, magnetic iron oxide coating, viz., gamma iron oxide pigment in a binder.

It is essential to the present invention that the epoxy-nitrile rubber adhesive be capable of remaining tacky for a time period ranging from about 30 minutes to about 24 hours, and more usually from about 30 minutes to 12 hours, and preferably from about 30 minutes to about 3 hours, so that during this time it does not "set-up" sufficiently so as to tear the paper fibers when the magnetic tape dimensionally stabilizes by moving in accordance with shrinkage or expansion characteristics at varying temperatures and humidity conditions. Usually the magnetic tape is in a stretched condition at the time of lamination so that it will shrink to varying extents subsequent thereto depending upon the aforementioned temperatures and atmospheric conditions; hence, it is necessary that the adhesive remain sufficiently flexible to accommodate this movement without tearing of the paper or curling of the ledger card paper base stock. Of course, at the same time there must be sufficient adhesion, provided by the adhesive composition, to enable the handling of the card without moving the magnetic tape thereon.

According to this invention when using a paper or other ledger card substrate having a basis weight of about 70 to about 110 pounds per ream, and when using a magnetic tape having approximately a 1.5 mil plastic thickness, and approximately a 0.5 mil magnetic oxide coating thickness; it has been found that the aforementioned epoxy-nitrile rubber adhesive should be supplied in the thickness of from about 0.3 to about 0.8 mils in order to obtain adequate adhesion without obstructing the laminating process and the efficiency of the resulting laminates. Thus use of less than about 0.3 mil thickness of the laminating adhesive yields insufficient adhesion and more than 0.8 mil thickness of the aforementioned adhesive causes excess adhesive to squeeze out from between the laminating interface of the tape (nonmagnetic surface) and the paper resulting in an unwanted deposit and accumulation of the adhesive on the laminating equipment. Of course, it should be realized that the thickness of the aforementioned adhesive composition to be applied will, among other things, be dependent upon the laminating speed, viz., the speed of the plastic tape at the time it is joined to the paper, along with the paper web speed, atmospheric conditions, temperature at which lamination is conducted, and other factors. Using the aforementioned adhesive composition, magnetic tape and paper ledger base stock having a basis weight of 99 pounds per ream; the web speed for the magnetic tape during lamination characteristically ranges from 150 to 1000 feet per minute and more usually ranges from about 400 to 600 feet per minute.

Of course, the adhesive must be sufficiently tacky when applied to the paper to fix (grab) on to the paper fibers. At a magnetic tape web speed of approximately 500 feet per minute, the laminating operation is conducted approximately 10 feet from the adhesive transfer roll (or equivalent device) which transfers the adhesive from an adhesive bath on to the surface of the magnetic tape (previously uncoated) which is to be joined to the paper. If the laminating is conducted at a distance too close to the site of the adhesive application to the magnetic tape, too much solvent is in the adhesive at the time it is joined to the paper and the adhesive is either not sufficiently tacky to properly adhere the magnetic tape to the paper or it is too liquid, in which case adequate dry coating thickness required for sustained adhesion is not obtained. As mentioned hereinabove, it is sufficient for the purposes of this invention to bring the two (or more) layers to be joined together with only slight or nominal pressure. No separate or extraneous pressure rolls are required for this purpose in order to accomplish satisfactory lamination.

While the ledger card base stock mentioned above has a basis weight of 99 pounds per ream, it should be understood that any plain paper having a basis weight ranging from about 45 to about 200 pounds per ream and more usually from about 70 to 110 pounds per ream can be satisfactorily employed in accordance with this invention. The term "ream" as used herein means 3000 square feet of paper or other substrate surface regardless of the individual sheet size(s).

It is also within the purview of this invention to employ as suitable paper ledger card substrate(s), mark-forming record media papers comprised of paper and containing on or in the paper various encapsulated materials including, but not limited to, the following: encapsulated dyes and dye solutions containing such dyes as crystal violet lactone, benzoleucomethylene blue, dissolved in organic solvents, such as, encapsulated reagents capable of reacting with the dyes to produce colored marks of various colors; etc. It is also within the purview of this invention to employ paper substrates containing (on or in one or more layers of paper) a combination of an encapsulated dye (or other coreactant) and an unencapsulated material which upon rupture of the capsule cell walls results in a chemical or other reaction between the materials on the paper producing a mark or other colored indicia in the regions where the capsules have been ruptured and the union of the encapsulated and unencapsulated materials takes place. A wide variety of these paper substrates can be employed in combination to yield "carbonless" mark-forming record media having magnetic storage capability. Typical exemplary dyes, capsule cell wall materials, coreactant clays, etc., can be found in U.S. Pats. No. 2,800,457 and 2,800,458, the disclosures of which are incorporated by reference.

This invention will be further understood by reference to the accompanying drawings. FIG. 1 is a side plan view showing in section a suitable apparatus for carrying out the laminating process on a continuous basis. FIGS. 2 to 8, inclusive, are cross-sectional views showing various laminated articles greatly enlarged for illustrative purposes.

EXAMPLE

The detailed description of FIG. 1 will be given in the example which follows:

| Adhesive (Swift & Co. "7162" Components) | Concentration (Wt. Percent) |
| --- | --- |
| Butadiene-acrylonitrile copolymer (nitrile rubber) ..... | 5 |
| Epoxy resin (containing components from unreacted | |

| | |
|---|---|
| monomer to pentamer) | 15 |
| Acetone | 70 |
| n-Hexane (and other $C_5$ hydrocarbons) | 10 |

A web (or layer) of ledger card paper base stock, having a basis weight of approximately 99 pounds per ream is passed from paper supply roll 1 between feed rolls 2 and in between the space provided between decurling bars 3. The purpose of the decurling bars is to substantially compensate for the curling effect produced on the paper due to its direction of roll upon the storage roll 1. The decurled paper is taken up on idler roll 4 and carried to the left of FIG. 1 as shown by the directional arrow on to lower calendaring roll 5' of the upper and lower calendaring rolls 5 and 5' respectively. While both of these rolls can be provided with raised portions for the purpose of providing grooves in both the upper and lower surfaces of the paper web; if only one stripe is to be applied to the paper, then only upper roll 5 is provided with a grooving surface. The width of the grooving surface is slightly wider than the width of the magnetic tape to be laminated. The groove(s) are provided in the paper in order to keep the upper surface of the magnetic tape low in comparison with the paper surface upon which it is laminated. The paper web is then carried back to the right hand side of FIG. 1 where it passes around support roll 6 and to idler roll 7 whence it takes a downward turn to idler roll 7'. Roll 7' is the location where the lamination of a lower magnetic tape to the paper occurs in those cases where the paper is to be striped on both the upper and lower surfaces, viz., more than one major surface thereof. At the upper left hand portion of FIG. 1, there are shown one or more magnetic tape supply rolls 9 containing "777" magnetic tape which pass beneath a pair of tension rolls 10 and have transferred on to the lower surfaces thereof, adhesive material via adhesive transfer roll 11 which in turn secures the adhesive from adhesive pickup roll 12 which is partially immersed in the above tabulated adhesive solution bath 13 in reservoir 14.

In the case where only one magnetic tape (stripe) is to be supplied, the lower surface of the magnetic tape is then passed to idler roll 15 where lamination of the magnetic tape to the paper actually occurs.

However, where a plurality of magnetic tape stripes are to be applied to the paper (at least one being applied to the upper surface and another being applied to the lower surface), the second magnetic tape destined to be on the bottom paper surface and having the adhesive applied to its undersurface via adhesive transfer roll 11 is angularly turned by angularly mounted grooved guide rolls 8, 8', 8" so that the adhesively coated undersurface is ultimately positionally reversed by 180° so that the adhesive is then present on the upper surface thereof due to the turning so that when it meets the paper coming downwardly from idler roll 7 at the lower of the roll 7', lamination occurs at this roll.

As will be noted the first grooved guide roll 8 at the left hand side of FIG. 1 turns the adhesively coated magnetic tape (by contact with the magnetic surface thereof) at an angle of about 75° to about 90° from the horizontally disposed surface in a vertical manner either left or right. Then as this magnetic tape passes to the second grooved guide roll 8', it is turned (rotated) at an angle of approximately 150° to 210° and more precisely at an angle approximating 180° from the position at which it left grooved guide roll 8. Then prior to lamination with the paper layer and subsequent to leaving grooved guide roll 8', the adhesively coated magnetic tape is given an additional turn at grooved guide roll 8" (approximately 90°) to complete the resultant positional reversal of approximately 180° with respect to that position of the tape as it left adhesive transfer roll 11. This then enables the upper, adhesive coated surface of the lower magnetic tape to contact the lower paper surface at the location of the laminating roll 7' thereby assuring adequate contact for lamination to occur between the second aforementioned magnetic tape and the paper or other base stock.

This paper thus containing both upper and lower magnetic storage stripes laminated thereto, then passes downwardly from idler roll 15 between upper and lower feed rolls 16 and 16', respectively, and thence between the upper and lower sheeter rolls 17 and 17', respectively. Upper sheeter roll 17 is equipped with a cutting blade 18 which, in cooperation with the rotating upper portion of lower sheeter roll 17', assists in cutting the laminated sheets 20 to the desired length. Of course, it will be noted that the cutting occurs perpendicularly to the longitudinal axis of the magnetic tape stripe on the paper. To aid in keeping the severed lengths of laminated ledger card 20 from moving upwardly, an air manifold 19 is provided which supplies a gentle current of air through a plurality of generally equally spaced openings, not shown, located in the bottom thereof thus keeping the severed lengths of laminated paper moving in a generally downward direction to form a stack 21 in container 22. Also, a static eliminator 23 can be employed to suppress generation of static electricity in the sheeter portion of the system.

As noted above, a variety of laminated structures are made available as a result of this invention. FIG. 2 shows an embodiment where paper (or other substrate) P has one magnetic tape (or stripe $T_1$, laminated thereto by deposited adhesive layer A, with the magnetic layer being located on the opposite (outside) surface. The embodiment of FIG. 3 is like that of FIG. 2 except that it has upper and lower magnetic tapes $T_1$ and $T_2$, laminated to the substrate thus providing magnetic storage capability on both surfaces thereof.

FIGS. 4 to 8, inclusive, are directed to mark-forming record media laminates having magnetic storage capability. The embodiment of FIG. 4 has a coated front face CF comprised of a clay, e.g., attapulgite, or phenolic resin material on paper substrate P. Upon reaction of the clay (or phenolic resin) acid reactive sites with a solution of a coreactant dye(s), e.g., crystal violet lactone and/or benzoleuco-methylene blue, a colored mark is formed. Since the dye solutions are encapsulated (in accordance with known procedures) capsule rupture produces a blue mark(s) in the area of rupture. The magnetic tape $T_1$ is laminated to the uncoated surface U with adhesive A as shown in FIG. 4. The embodiment of FIG. 6 illustrates a laminated article similar to that of FIG. 4 except that the upper surface U is uncoated and the back surface has a coating CB containing an encapsulated dye solution and the magnetic stripe $T_1$ laminated thereto by adhesive A. In the FIG. 5 embodiment the CF coating containing clay and/or phenolic resin material (having acid sites) is applied to both major surfaces of substrate P and upper and lower magnetic tapes $T_1$ and $T_2$, respectively, are adhered thereto in the manner set forth above and shown in FIG. 1. The embodiment of FIG. 7 has a clay and/or phenolic resin-containing CF coating on its upper surface and an encapsulated dye solution-containing CB coating on its lower surface with the magnetic tape $T_1$ adhered to the CB coated surface. Paper and other substrates having this CF-CB coating arrangement are also known as CFB sheets. The embodiment of FIG. 8 illustrates a multiple part form M for mark-forming record media wherein five sheets are positionally associated one upon the other in a stack (greatly exaggerated for illustrative purposes). The top sheet is either a CB or CFB sheet. Where a CB sheet is used, its bottom surface has the CB coating. The next three sheets are CFB sheets and the bottom sheet is a CF sheet with the CF coating on its upper surface. The magnetic storage capability is provided by tape $T_1$ laminated to the uncoated bottom surface U of the CF sheet with adhesive A. Subsequent to mark formation each of the five sheets can be separated. Of course, such a multiple part form can have more or less than five sheets.

The laminates prepared in accordance with the procedures discussed hereinabove are comprised of paper, plastic or equivalent substrates having a basis weight ranging from about 45 to about 200 pounds per ream adhered to a polyester or equivalent layer having on its outer surface (away from the adhesive) a magnetic layer and usually a magnetic oxide, e.g., iron oxide, layer located over substantially the entire width of the tape. Preferably the epoxy-nitrile rubber adhesive employed to join said plastic tape to said paper or other substrate is comprised of 18 to 22 weight percent of solids comprised of from about 23 to about 27 weight percent of a copolymer of butadiene-1,3 and acrylonitrile and from about 73 to about 77 weight percent of an epoxy resin with the remaining 78 to 82 weight percent being comprised of an organic solvent mixture having a major concentration of ketones; e.g., acetone, and a minor concentration of $C_6+$ paraffins, e.g., n-hexane and other $C_6$ aliphatic and alicyclic hydrocarbons.

We claim:

1. An in-line method for forming magnetic ledger cards comprising applying a solvent-based, temporarily pressure-sensitive adhesive composition to the under surface of a flexible plastic tape having a magnetic layer on the remote surface thereof; passing said adhesively coated magnetic tape into contact with the surface of a continuous ledger card substrate having a basis weight ranging from about 45 to about 200 pounds per 3000 ft.$^2$ ream; said adhesive composition comprising from about 10 to about 30 wt. percent solids, the remainder being a liquid organic solvent, said solids comprising from about 65 to about 85 wt. percent of a condensate of an epihalohydrin and a bisphenol and from about 15 to about 35 wt. percent of a copolymer of acrylonitrile and butadiene; said adhesive composition having a viscosity of from about 55 to about 95 c.p.s., said adhesive composition being capable of remaining tacky for from about 30 minutes to about 24 hours while retaining sufficient flexibility to accommodate post lamination dimensional stabilization of the flexible tape without ledger card curling or tearing yet providing sufficient adhesion to enable card handling after lamination but before adhesive setting; and said adhesive composition having a ledger card substrate to tape Instron bond strength of at least 50 grams per 0.25 inch of tape width after desolvation and adhesive setting.

2. A method as in claim 1 wherein said ledger card substrate is comprised of paper.

3. A method as in claim 1 wherein said flexible plastic tape is a polyester tape.

4. A method as in claim 1 wherein said adhesive is applied to the nonmagnetic surface of said tape in a layer ranging from about 0.3 to about 0.8 mil thick and said tape and substrate are then joined together.

5. A method as in claim 4 wherein the viscosity of said adhesive solution at the time of application to said tape ranges from about 60 to about 90 c.p.s.

6. A method as in claim 1 wherein said plastic tape has a thickness ranging from about 0.3 to about 1.7 mils and said magnetic layer has a thickness ranging from about 0.1 to about 0.7 mils.

7. A method as in claim 4 which includes grooving said ledger card substrate prior to positioning the adhesively coated surface of said tape in contact therewith.

8. A method as in claim 4 which includes decurling said ledger card substrate prior to joining said substrate to said tape.

9. A method as in claim 4 which includes adhering another magnetic tape to the other side of said ledger card substrate using said temporarily pressure-sensitive adhesive.

10. An in-line method for forming magnetic ledger cards having magnetic storage on both the upper and lower surfaces thereof comprising applying a solvent-based, temporarily pressure-sensitive adhesive composition to the nonmagnetic under surface of at least two flexible plastic tapes, each having a magnetic layer on the remote surface thereof; passing at least one of said adhesively coated magnetic tapes into contact with the upper surface of a continuous ledger card substrate layer while passing at least one other of said adhesively coated magnetic tapes into contact with the lower surface of said ledger card substrate wherein said other tape laminated to said lower surface is turned at a resultant angle of about 150° to about 210° as between its position at said adhesive application and the subsequent contact of its upper adhesive surface with the lower ledger card surface; said adhesive composition comprising from about 10 to about 30 wt. percent solids, the remainder being a liquid organic solvent, said solids comprising from about 65 to 85 wt. percent of a condensate of an epihalohydrin and a bisphenol and from about 15 to about 35 wt. percent of a copolymer of acrylonitrile and butadiene; said adhesive composition having a viscosity of from about 55 to about 95 c.p.s.; said adhesive composition being capable of remaining tacky for from about 30 minutes to about 24 hours while retaining sufficient flexibility to accommodate post lamination dimensional stabilization of the flexible tape without ledger card curling or tearing yet providing sufficient adhesion to enable card handling after lamination but before adhesive setting; and said adhesive composition having a ledger card substrate to tape Instron bond strength of at least 50 grams per 0.25 inch of tape width after desolvation and adhesive setting.

11. A method as in claim 10 wherein said resultant turning angle is approximately 180°.

12. A laminated article having magnetic storage comprising a substrate having a basis weight of from about 45 to 200 pounds per 3000 ft.$^2$ ream and at least one groove in a surface thereof and positioned within said groove at least one flexible plastic magnetic tape adhered to said substrate by an adhesive composition comprising (on a dry basis) from about 65 to about 85 wt. percent of a condensate of an epihalohydrin and a bis phenol and from about 15 to about 30 wt. percent of a copolymer of acrylonitrile and butadiene.

13. An article as in claim 12 wherein said substrate is comprised of paper.

14. An article as in claim 13 wherein said paper includes mark-forming materials contained on or in the paper wherein said mark-forming materials comprise dyes or dye solutions and reagents capable of reacting with the dyes or dye solutions to produce colored marks and wherein at least one of the mark-forming materials is encapsulated.

15. An article as in claim 12 wherein said flexible plastic magnetic tape is comprised of a flexible plastic tape substrate having a thickness ranging from about 0.3 to about 1.7 mils and a magnetic layer having a thickness ranging from about 0.1 to about 0.7 mils located on the surface remote from said adhesive.

16. An article as in claim 15 wherein said magnetic layer is comprised of a magnetic oxide extending substantially the entire width of said tape substrate.

17. A laminated article having magnetic storage comprising a paper substrate having a basis weight ranging from about 45 to about 200 pounds per 3000 ft.$^2$ ream and at least one groove in a surface thereof and positioned within said groove at least one flexible polyester tape having a magnetic oxide layer on one surface and an adhesive composition on its other surface facing said paper substrate adhesive joining said tape to said paper with an Instron bond strength of at least 50 grams per 0.25 inch of tape width and comprised (on a dry basis) of from about 65 to about 85 wt. percent of a condensate of an epichlorohydrin and a bis phenol and from about 15 to about 35 wt. percent of a copolymer of acrylonitrile and butadiene.

* * * * *